Dec. 31, 1968   M. E. MARTIN   3,419,857
ANNUNCIATOR SYSTEM
Filed Oct. 8, 1964   Sheet 1 of 3

INVENTOR
Merle E. Martin

BY
ATTORNEY

INVENTOR
Merle E. Martin

BY

ATTORNEY

INVENTOR
Merle E. Martin

ATTORNEY

United States Patent Office 3,419,857
Patented Dec. 31, 1968

3,419,857
ANNUNCIATOR SYSTEM
Merle E. Martin, Dallas, Tex., assignor to Beta Corporation, Dallas, Tex., a corporation of Texas
Filed Oct. 8, 1964, Ser. No. 402,653
8 Claims. (Cl. 340—213.1)

ABSTRACT OF THE DISCLOSURE

An annunciator for indicating malfunctions occurring in monitored equipment including three visual indications for each station monitored, e.g. red, pink, and white, at least one visual indication may be latched until the annunciator is reset and selection means are provided for choosing between either a first out or mark-acknowledge mode of operation.

---

The present invention relates to annunciator systems for monitoring the operation of various types of processes and equipment and indicating the presence of a malfunction and, more particularly, to an annunciator system which is readily adaptable for operation in either the first out mode or the marked acknowledge mode.

Many types of complex processes and equipment are operated from a central control room. In such a central control room, it is common to provide an annunciator system which is connected to selected stations for monitoring the operation of the process or equipment. In the event of malfunction, a signal device is energized for indicating the presence of a malfunction. Normally, an audible warning device will also be actuated.

In many types of processes, failure or malfunction at some point in the process can result in extensive damage to the processing equipment if the process is permitted to continue. Accordingly, in most processing equipment, it is common to provide automatic shut down equipment which will sequentially disable all of the equipment involved in the process to prevent such damage. As each piece of equipment is shut down, it will be indicated on the annunciator panel by an indication of a malfunction. It is therefore desirable in such applications that the annunciator system be of the type commonly known as the first out system. In the first out system, each of the stations being monitored will indicate the malfunction as the respective associated equipment is disabled. However, for purposes of determining and correcting the piece of equipment which actually malfunctioned, it is desirable that a signal of a different character be utilized for indicating the first station which signaled the presence of a malfunction.

In other applications, such as for example an annunciator used for monitoring each of several propulsion engines which may be provided in an engine room, a system known as the mark acknowledge system is usually preferred. In such a system, as each malfunction occurs, like signals will be provided. When the operator of the equipment becomes aware of the malfunction, he will acknowledge the indicated information by actuating a switch or other means. When the malfunctions are acknowledged by the operator, the character of the signals displayed will change. Succeeding malfunctions will again be of the initial character such that the next time the annunciator control panel is observed, it will be readily apparent to the operator whether succeeding malfunctions have occurred.

The present invention provides an improved annunciator system which is capable of being operated in either the first out mode or the mark acknowledge mode. The annunciator provided by the present invention is substantially less complex than known prior art annunciators for accomplishing or providing the same functions and is, in general, considered more reliable. In accordance with the present invention, the plurality of indicating units are provided. The number of indicating units will be equal to the number of stations which are to be monitored with each of the stations providing to its respective indicating unit a signal responsive to the presence of a malfunction. The signal provided can either be ground or a voltage pulse. The indicating units are suitably of the plug-in modular type. Each of the indicator units includes a first signal generating means for producing a signal of one character and a second signal generating means for producing a signal of a different character. Upon the occurrence of a malfunction, the signal is applied from the field contact or station to the respective indicating units. Each of the indicating units further includes means effective responsive to such a signal for energizing the first signal generating means. A control unit having a condition responsive element commonly connected to each of the indicating units is also provided. Each of the indicating units also includes means effective when the condition responsive element is in one condition and when the first signal generating means is energized for energizing the second signal generating means. However, when the condition responsive element of the control unit is in the other condition, the second signal generating means will not be energized responsive to the first signal generating means being energized.

In accordance with the preferred embodiment of the invention, each of the indicating units includes a first switching device which is normally in one state but is capable of being excited to a second state when a control signal is supplied thereto. The first switching device is connected in circuit with a first signal means for controlling the energization of the first signal means. There is also provided a second switching device which is similarly connected to control the energization of a second signal means. The signal produced at a station in response to the presence of a malfunction is applied to the first swiching device to cause it to assume the second state in which the first signal means is energized. The indicaing unit further includes means for applying to the second switching device a signal to cause the second switching device to assume the second state responsive to the first switching device being switched to the second state.

There is also provided a condition responsive element which is common to all of the indicating units within a group for inhibiting the application of the signal to the second switching device. Thus, when the condition responsive element is in one condition, the application of malfunction signal from one of the field stations will only cause the first signal means to be energized. However, when the condition responsive means is in the other condition, the second signal means will be energized responsive to first signal means being energized.

In accordance with the preferred embodiment of the present invention, the first and second switching devices are each silicon controlled rectifiers, the first signal means is a lamp of one color, and the second signal means is a lamp of a different color. When the apparatus is to be operated in the first out mode, the condition responsive means is suitably still a third silicon controlled rectifier (SCR) which is switched to the low impedance state responsive to the first one of the indicating means within a group receiving a signal indicating a malfunction. The third SCR is connected in circuit with each of the indicating units to inhibit the application of a control signal to the gate of the second SCR when the third SCR is in its low impedance state. Both the first and second signal means or lamps are positioned beneath a light diffusion member such that when both of the lamps are lit, the indication received will be a pinkish color and when only the first lamp is lit, the light diffusing member will glow with a lighter color. Thus, upon the first indication of a malfunction, the indicating unit associated with the particular station will glow red. However, when the first indicating unit is energized, the third SCR will receive a signal causing it to assume its low impedance state and inhibit the application of a control signal to the second SCR and the other indicating units within the group. Each of the indications of a malfunction subsequently received will therefore only be effective to cause the first signal means or lamp to be energized.

When the annunciator system is to be operated in the marked acknowledge mode, the condition responsive means or element is suitably a switch. This switch is normally maintained in condition to inhibit the application of a signal to the second SCR. Therefore, each signal from one of the field stations indicating the presence of a malfunction will only be effective to cause the first signal means or white lamp to be lit. However, if the switch is opened, signals will be applied to each of the second SCR's of indicating units which are connected to field stations wherein malfunctions are present, causing the associated indicating units to glow pink or red. When the switch is again closed, the indicating units indicating a malfunction to that point will remain with the red indication. However, subsequent malfunctions of different field stations will only cause their respective indicating units to glow white.

Many objects and advantages of the present invention, whose features are set forth with greater particularity in the appended claims, will become apparent to those skilled in the art as the following detailed description of the same unfolds when taken in conjunction with the appended drawings wherein like reference numbers denote like parts and in which:

Figure 1:
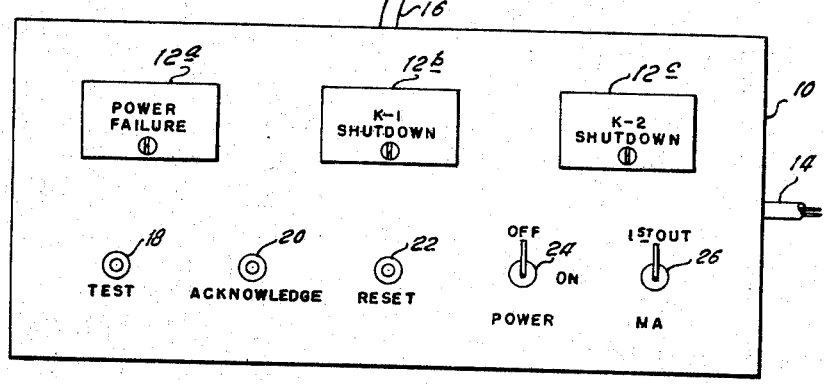
FIGURE 1 is a plan view illustrating an annunciator panel suitable for use with the present invention.

Turning now to the drawings, there is shown in FIGURE 1 a control panel 10 of the type suitable for use in practicing the invention. The control panel 10 can be seen to include a plurality of indicator units 12a–12c which are mounted in the upper surface of the control panel. Although only three indicator units are shown, it will be appreciated that the number actually utilized will vary dependent upon the number of field stations to be monitored, and in a practical installation this number can range upward well in excess of 100 such indicator units. In accordance with the preferred embodiment of the invention, the system is operated from a direct current supply source and, accordingly, cable 14 is provided for connecting the panel 10 to a source of direct current supply voltage. Cable 16 is similarly provided for connecting the control panel 10 to the field stations which are to be monitored. Positioned on the panel 10 also is a test switch 18, an acknowledge switch 20, a reset switch 22, a power switch 24, and a function switch 26.

Figure 2:
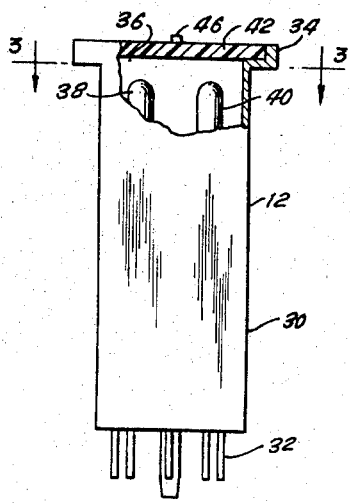
FIGURE 2 is a side elevation view of an indicator module.
Figure 3:
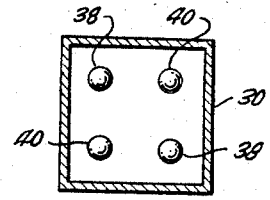
FIGURE 3 is a line taken along line 3—3 of FIGURE 2.
Figure 4:
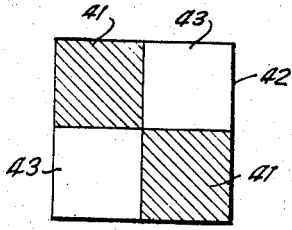
FIGURE 4 is a plan view illustrating the manner in which portions of the lower surface of a light diffusing member can be colored to achieve the effect of different colored lamps.

As best shown in FIGURES 2 and 3 of the drawings, the indicator units 12 are suitably of molded construction and include an elongated body portion 30 in which the circuitry associated with an indicator unit is enclosed. A plurality of pins 32 extend from the lower surface of the indicator unit 12 for purposes of connecting the indicating unit to the control circuitry and power supply included within the control panel 10. The upper portion 34 of the indicating unit 12 is suitably enlarged and a cavity 36 is defined therein. In accordance with the preferred embodiment of the present invention, four lamp bulbs are positioned within the cavity 36, two of the lamps being colored red, indicated by the reference character 38, and two of the lamps being white as indicated by the reference character 40. Positioned above the lamps 38 and 40 and extending into the cavity 36 is a body 42 of translucent light diffusing material. The body 42 of light diffusing material is suitably attached to the upper surface of the indicating unit 12 by a thumb screw 46, and indicia may be provided thereon indicating the field station being monitored. When the red lamps 38 are energized, the material 42 will be lit with a red color. If only the lamps 40 are lit, the white light will shine through the material 42 and 44. If both the lamps 38 and 40 are lit, the indicator unit will appear a pinkish color. Alternatively, rather than provide lamps 38 of different colors, portion 41 of the lower surface of the light diffusing element 42 can be colored as shown in FIGURE 4, with the portions 43 being clear. The portions 41 are positioned to oppose the lamps 38, and when lamps 38 are lit, the light produced will pass through the colored portions causing the entire element 42 to glow with a red color. White lamps can thereby be used for both lamps 38 and 40.

Figure 5:
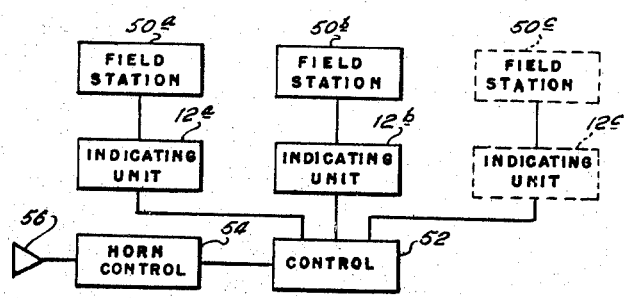
FIGURE 5 is a block diagram illustrating the principles of the present invention.

Referring now to FIGURE 5 of the drawings, there is shown a block diagram illustrating the cooperation and connections between the various elements of an annunciator system in accordance with the present invention. Thus, a plurality of field contact members 50 are provided. One of the field contact members 50 is associated with each field station to be monitored and in the event of malfunction at a station being monitored, the field contact associated therewith will either be open or closed to apply either a ground or electrical signal to the annunciator system. One of the indicating units 12 is associated with each of the field contacts and connected thereto. Each of the indicating units 12 is commonly connected to a control unit 52. The control unit 52 is also connected to a control unit 54 for a central warning device, suitably a horn 56.

In operation of the annunciator system of the present invention, the power switch 24 is placed in the on position to apply DC power to the control circuitry and individual indicating units. Function switch 26 is placed in either the FIRST OUT or the MARK ACKNOWLEDGE position, depending upon the desired function to be achieved. In this connection, it will be appreciated that in many instances duality of function is not necessary, in which event the function switch would not be required and the control circuitry would be arranged to accomplish the desired function.

Assuming that the system is to be operated in the first out mode, the function switch would be placed in that position. The test switch would then be pressed momentarily to determine if the indicator units appear to be operating properly. When the test switch 18 is depressed, each of the indicating units should glow red and the horn should sound. Reset switch 22 is then depressed to place all the indicating units in the initial condition in which none of the lamps are lit. Thereafter, upon the occurrence of a first malfunction, the indicating unit associated with the particular field contact will glow red and the horn 56 will sound an audible alarm. The audible alarm will continue to sound until the acknowledge switch 20 is depressed, which will remove power from the horn 20. If additional malfunctions occur subsequent to the first one, only the white lamps will be lit and the indicating units indicating such a malfunction will glow white. Subsequent to correcting of the malfunctions, the reset switch is again depressed, and the control panel will return to its initial state in which none of the indicating assemblies are lit.

As mentioned previously, the first out mode of operation is especially useful in process monitoring wherein malfunction at one point in the process will usually cause a sequence of malfunctions. It is therefore of great benefit during the malfunction to know which malfunction occurred first. Also, as mentioned previously, in those annunciator applications wherein certain types of machinery and equipment are involved, the sequence in which the malfunctions occur are of no significance and a mark acknowledge mode of operation is usually considered more desirable.

In the mark acknowledge mode of operation, if a malfunction signal is received from any of the field contacts, the indicating unit associated therewith will cause the white lamp to be energized, and the indicating assembly will glow white. The horn 56 will also be energized, causing an audible signal to be produced to call the operator's attention to the malfunction. Succeeding malfunctions which may occur prior to the time that the malfunction is acknowledged will also cause the indicating units associated therewith to glow white.

When the acknowledge switch 20 is depressed, each of the indicating units indicating a malfunction at that time will be caused to glow either pink or red, depending upon the provisions made for removing power from the white lamps, and the power will be removed from the horn 52, causing the audible signal to be removed. Each of the indicating signals which indicated a malfunction up until this point will thereafter continue to glow either red or pink. If subsequent malfunctions should occur while the previous malfunctions are being repaired, the indicating assemblies associated with the field contacts indicating the malfunction will glow white, and the horn 56 will again be energized, calling the operator's attention to the fact that there are additional malfunctions. Since the malfunctions which existed prior to the previous acknowledgement are indicated by red lights and the malfunctions which occurred subsequent to the previous acknowledgement are indicated by white lights, it will therefore be apparent to the operator which malfunctions have previously received his attention and which ones have not. At such time as all the malfunctions have been corrected, the reset button is again depressed, returning each of the indicating units to a state in which none of the lamps are lit. Subsequent new malfunctions, or if the old malfunctions have not been corrected, will cause the field contacts to again apply signals, indicating malfunctions to the control system and the appropriate indicating units will again be lit and caused to glow white.

Figure 6:
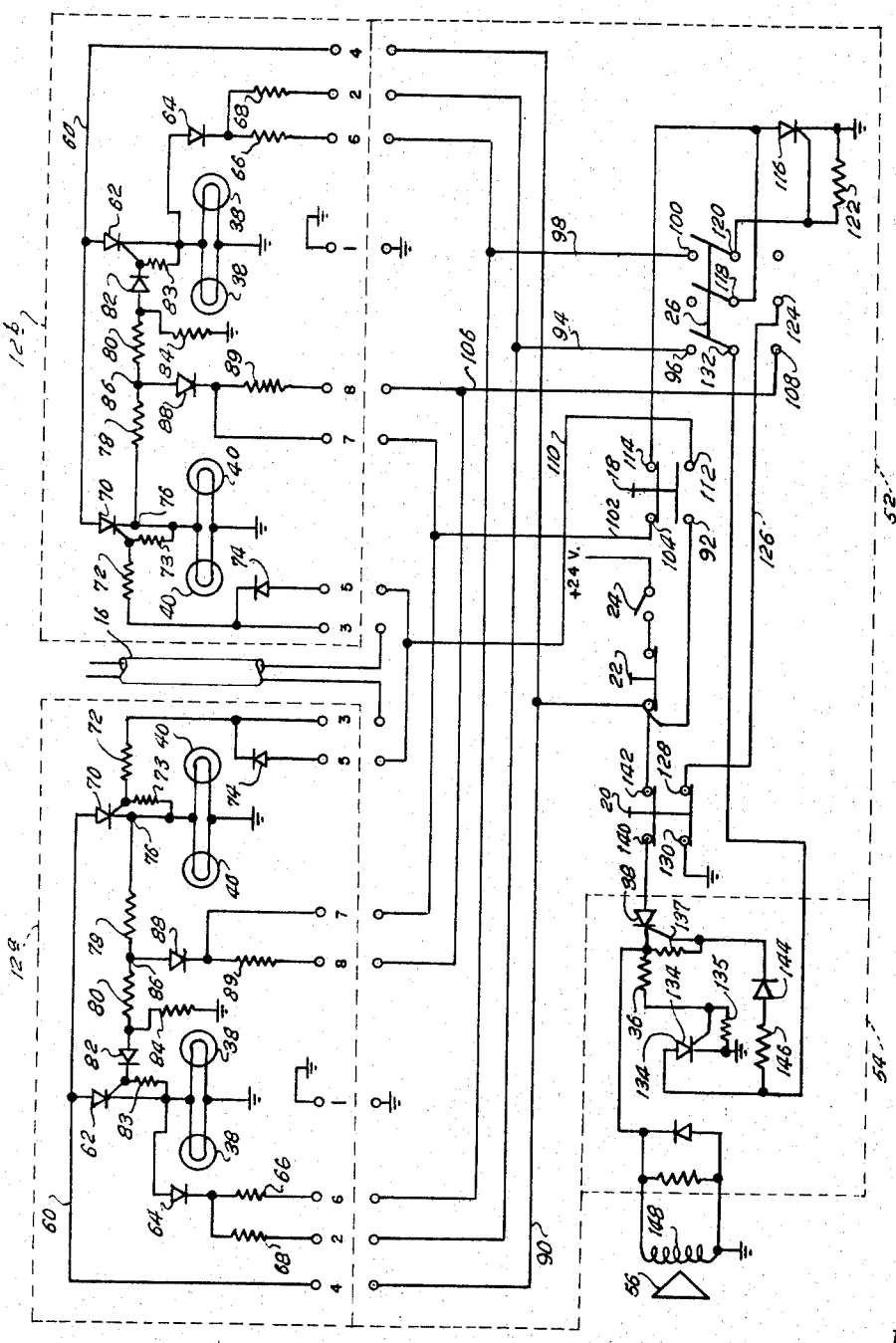
FIGURE 6 is a schematic diagram illustrating an annunciator indicator unit and control in accordance with the present invention.

A preferred embodiment of the present invention for accomplishing the foregoing functions is shown in greater detail in FIGURE 6 of the drawings. Thus, as shown in FIGURE 6, it can be seen that each of the indicating units 12 include a pin 4 which is connected to a line 60. Line 60 is connected to the anode of SCR 62. The cathode of the SCR 62 is connected through the lamps 38 to pin 1. The cathode of the SCR 62 is also connected to the anode of a diode rectifier 64. The cathode of the diode rectifier 64 is connected through a resistor 66 to pin 6 and through resistor 68 to pin 2.

The line 60 is also connected to the anode of SCR 70.

The cathode of the SCR 70 is connected through the lamps 40 to pin 1. The gate electrode of the SCR 70 is connected through resistor 72 to pin 3. The gate electrode of SCR 70 is also connected through resistor 72 and diode rectifier 74 to pin 5. The juncture 76 between the cathode of the SCR 70 and the lamps 40 is connected through resistor 78 and resistor 80 to the anode of a diode rectifier 82. The cathode of the diode rectifier 82 is connected to the gate electrode of the SCR 62. The anode of the diode rectifier 82 is connected through a resistor 84 to pin 1. Juncture point 86 between resistor 78 and resistor 80 is connected to the anode of the diode rectifier 88, the cathode of the rectifier 88 being connected to pin 7. The juncture point 86 between the resistor 78 and resistor 80 is also connected to pin 8 through diode 88 and resistor 89.

When the indicating units are inserted into the control panel 10, the pins 4 of all of the indicating units are commonly connected by line 90 to one side of a switch 22 which is spring loaded in the closed position and to terminal 92 of switch 18. Thus, when the switch 24 is closed, power will be applied to each of the indicating units 12 by switch 22, line 90 and pins 4. Similarly, each of the pins 6 are commonly connected by line 98 to pin 100 of the function switch 26. Each of the pins 1 are connected to ground and each of the pins 7 are commonly connected by line 102 to terminal 104 of switch 18. The pins 8 of each of the indicating units inserted into the annunciator assembly are commonly connected by line 106 to terminal 108 of switch 26 and the pins 5 are commonly connected by line 110 to terminal 112 of switch 18. Each of the terminals 3 of the indicator units are separately connected by an individual connector included in the cable 16 to one of the field contacts.

Terminal 114 of switch 18 is commonly connected to the anode of SCR 116 and to a terminal 118 of switch 26. The cathode of SCR 116 is connected to ground. The gate electrode of the SCR 116 is connected to terminal 120 of switch 26 and through resistor 122 to the cathode of SCR 116. Terminal 124 of switch 26 is connected by line 126 to terminal 128 of switch 20. Terminal 130 of switch 20 is connected to ground. Terminal 132 of switch 26 is connected to the anode of SCR 134.

From the above, it can be seen that when the switch 26 is in the first out position, that terminal 132 of switch 26 will be connected to terminal 96, terminal 118 will be open, and terminal 120 of switch 26 will be connected to terminal 100 thereof. When the test switch 18 is depressed, the circuit between terminals 104 and 114 thereof will be broken and terminals 92 and 112 of switch 18 will momentarily be connected. 12 volts DC will therefore be applied through terminals 92 and 112 of switch 18 and line 110 to terminal 5 of each of the indicating units. The diode 74 in each of the indicating units is poled such that positive voltage will be applied to the gate electrode of SCR 70 of each indicating unit.

Each of the SCR's 70 will thereupon conduct, causing each of the lamps 40 to become lit. The potential present at the juncture point 76 is thereby applied through diode rectifier 82 to the gate electrode of SCR 62, causing SCR 62 to also conduct. When the SCR 62 switches to its low impedance state, current will flow through the lamps 38, causing both the red and white lamps to be lit and accordingly producing a pinkish glow at the exposed surface of each of the indicating units.

The potential produced at the juncture point 65 between lamps 38 and the cathode of the SCR 62 is applied through the diode rectifier 68 to pins 2 and 6 of each indicating unit. The potential which appears at pins 2 of the indicating units is applied through line 94 and contacts 96 and 132 of switch 26 to the anode of the SCR 134. The gate electrode of SCR 134 is connected through resistor 136 to the cathode of SCR 138. The anode of SCR 138 is connected through terminals 140 and 142 to the normally closed switch 22. Since the switch 20 is spring biased in position to provide a conductive path between terminals 140 and 142, power will normally be applied continuously to the anode of SCR 138. The gate electrode of SCR 138 is connected to the cathode of a diode rectifier 144, the anode of the rectifier 144 being connected through resistor 146 to the anode of SCR 138.

It will therefore be apparent that when positive voltage appears at pin 2, that the positive potential will be simultaneously applied to the anode of SCR 134, and to the gate electrode of SCR 138. SCR 138 will thereupon be switched to the low impedance state. When the SCR 138 switches to the low impedance state, biasing current is applied to the gate electrode of the SCR 134, causing the SCR 134 to also switch to the low impedance state. It will be noted that the cathode of SCR 134 is connected to ground. When the SCR 138 conducts, power will be also applied to the coil 148 of the horn 56, producing an audible warning sound.

When the reset switch 22 is depressed, power will be removed from all parts of the system and the horn will be turned off and all the lights in the indicating units will be turned off. The purpose of the test switch is, of course, to assure the operator that the horn and all of the lights are operating properly. When a positive voltage pulse is applied from one of the field contacts to terminal 3 of one of the indicating units 12, indicating the presence of a malfunction, the SCR 70 within the particular indicating unit will be biased on, causing the lamp 40 to become lit. It will be noted that the diode rectifier 74 connected between terminal 5 and resistor 72 is poled to prevent a signal from one of the field coils being applied through the test line to the other indicating units. When the SCR 70 switches to its low impedance state, the potential appearing at point 76 will be sufficient to bias the SCR 62 on also, causing the red lamps 38 to become lit. The potential appearing at terminal 2 will be effective to cause the horn 56 to be energized and produce an audible warning signal that a malfunction has occurred. Also, potential will be applied through terminal 6 of the indicating unit and line 98 to terminal 100 of switch 26.

With the switch 26 in a position for operation in the first out mode, terminal 100 is connected to terminal 120, thereby applying positive voltage to gate electrode of SCR 116. The anode of SCR 116 is connected through terminals 104 and 114 of switch 18 and line 102 to terminal 7 of the indicating unit 12. Since terminal 7 of the indicating unit 12 is connected through the diode rectifier 88 to the juncture point 86, positive voltage will thereby be applied to the anode of the SCR 116 and the SCR 116 will switch to its low impedance state. In this connection, it will be observed that the diode rectifier 88 provided in each of the indicating units 12 prevents the positive voltage appearing at the terminal 7 of one of the indicating units being applied to the gate of SCR 62 in the other indicating units to the low impedance state.

When the SCR 116 assumes its low impedance state, the juncture point 86 of each of the indicating units will fall to near ground potential. Therefore, when any other indicating unit subsequently receives a signal indicating the presence of a malfunction, the ground provided by SCR 116 when in its low impedance state will prevent a signal being applied to the SCR 62 in such other indicating unit of a character to cause the SCR 62 to switch to the low impedance state, although the switching of SCR 70 to the low impedance state will not be affected. Therefore, it will be seen that the first indicating unit to receive a malfunction signal will be controlled such that both of the lamps will become lit. However, upon any subsequent application of a malfunction signal to other indicating units, only the white lamps will become lit.

From the above, it will be obvious that an operator observing the system can readily ascertain that the station indicating a malfunction by a red light will be the first to malfunction. When the malfunction is observed, the operator will depress the acknowledge switch, causing the contact between terminals 140 and 142 of the switch 20 to be broken and remove power from the anode of SCR 138. Power will therefore be removed from the horn 56. The SCR 134 will, however, continue to conduct in its low impedance state, effectively shorting the gate electrode of SCR 138 to ground and preventing the application of a signal to the gate of SCR 138. Subsequent malfunctions will therefore not again cause the audible alarm to be sounded, and the operator may not become aware of their occurrence.

Figure 8:
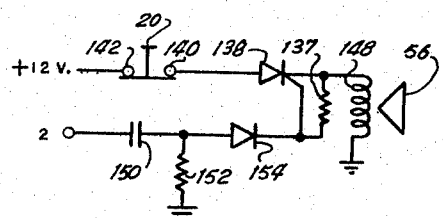
FIGURE 8 is a schematic diagram illustrating an alternative method controlling the application of power to an audible warning device.

Accordingly, a horn circuit such as shown in FIGURE 8 is therefore preferred in some applications. The horn control circuit of FIGURE 8 is quite similar to that shown in FIGURE 6. Thus, a source of positive voltage is connected through the terminals 140 and 142 of switch 20 to the anode of SCR 138, with the cathode of SCR 138 being connected in series with the coil 148 of the horn 56 and ground. However, in the embodiment of the invention shown in FIGURE 8, the gate electrode of the SCR 138 is connected through diode 144 and capacitor 150 to terminal 132 of switch 26. The juncture between the diode 144 and the capacitor 150 is connected to ground through resistor 152. When a voltage first appears at juncture point 65 of any one of the indicator units 12, a change in voltage appearing at point 65 will be differentiated by the capacitor 150 and resistor 152, applying a positive pulse to the gate electrode of the SCR 138 to cause the device 138 to switch to its low impedance state and permit current to flow through the coil of the horn 56. However, when the connection between terminals 140 and 142 of switch 20 is broken, SCR 138 will switch to its high impedance state, removing power from the coil to the horn 56. Although a voltage may be present at juncture 65, the direct current voltage will be blocked by the capacitor 150, causing the device 138 to remain in its high impedance state. By connecting the pin 2 of each indicating unit to juncture 76, each time current begins to flow through the lamp 40 of one of the indicating units, a signal will be applied to cause actuation of the horn 56 and any malfunction occurring subsequent to operation of the acknowledge switch will cause the horn to sound.

Figure 7:
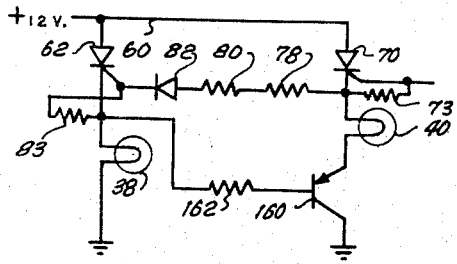
FIGURE 7 is a schematic diagram illustrating a modification to the indicator unit of the type shown in FIGURE 6.

It is sometimes desirable also that either a bright red or a white light be presented rather than a pink one. To achieve such a result, it is necessary that the white light be turned off when the red light is turned on. The circuit of FIGURE 6 can be modified as shown in FIGURE 7 to accomplish such a result. Thus, as shown in FIGURE 7, it is practical to connect the low voltage side of the lamp 40 to the emitter of a PNP transistor 160, the collector of the transistor 160 being connected to ground. The juncture point 65 between the SCR 62 and the lamp 38 is connected through resistor 162 to the base of the transistor 160. Using such an arrangement, when the SCR 70 is in its low impedance state and SCR 62 is in the high impedance state, the emitter of the transistor 160 will be more positive than the base and the transistor will present a very low impedance path between its emitter and collector electrodes, but only the lamp 40 will be lit. However, if the SCR 62 is in the low impedance state causing the lamp 38 to be lit, voltage appearing at point 65 will cause the base of the transistor 160 to become more positive, causing the transistor 160 to shut off and provide a high impedance path to the flow of current through the lamp 40. The lamp 40 will therefore not be lit when lamp 38 is lit.

When the function switch 26 is placed in the marked acknowledge position, terminal 120 will be open, terminal 118 of switch 26 will be connected to terminal 124 and terminal 132 will be connected to terminal 108 of switch 26. As described previously, terminal 124 of switch 26 is connected through terminals 128 and 130 of switch 20 to ground. The juncture point 86 of each of the indicating devices 12 will therefore effectively be at ground potential, preventing the SCR 62 ever being switched to the low impedance state so long as the juncture point 86 is at ground potential. Therefore, when a signal is applied to one of the indicating units 10 indicating a malfunction at its associated field contact, the SCR 70 of the particular indicating unit will be turned on, causing the white lamps 40 to become lit. As mentioned previously, the juncture point 86 is, however, at ground potential, preventing the lamp 38 being lit.

The juncture point 86 is also connected through terminal 8, line 106, terminals 108 and 132 of switch 26 to the anode of SCR 134. When power is applied to the anode of SCR 134, power will be applied to the horn 56 as described previously, and an audible warning sound will be provided. As additional ones of the indicating units 12 receive signals from their associated field contacts that malfunctions have occurred, only the white lamps of the indicating units will become lit.

However, when the MARKED ACKNOWLEDGE switch 20 is depressed, ground will be removed from the juncture point 86 of each of the indicating units, lamps 40 of each of the units in which the SCR 70 is conducting will become lit. When the switch 20 is released, ground will again be applied to juncture point 86. However, any device 62 which is at that time conducting will remain conducting and the respective indicating units 12 will remain with a red display, indicating that these particular malfunctions have been observed by the operator at the time he operated the acknowledge switch. However, since ground is once again applied to the juncture point 86, any subsequent malfunctions will be indicated by a white glow rather than a red glow, and any subsequent malfunctions will also cause the horn 56 to again be actuated or energized.

Figure 9:
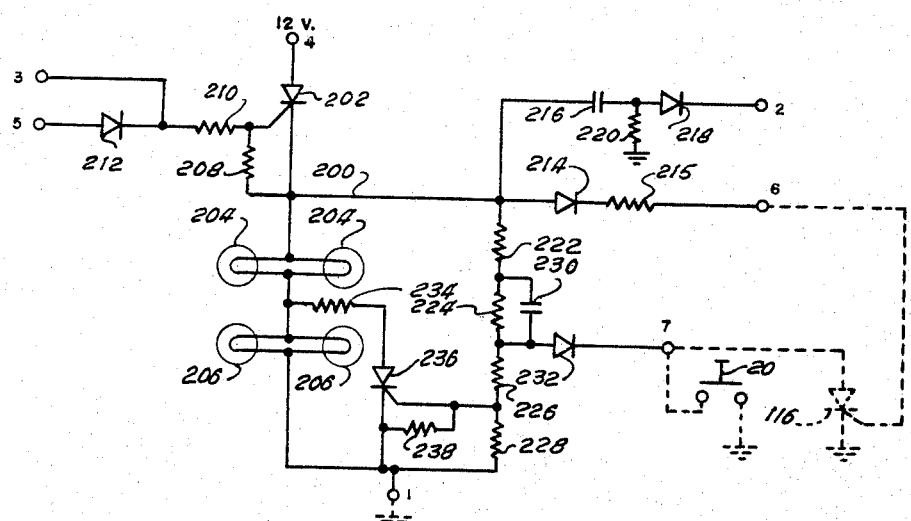
FIGURE 9 is a schematic diagram of an indicator unit utilizing the principles of the present invention.

Turning now to FIGURE 9 of the drawings, there is shown a different indicating unit 200, but which utilizes the principles of the present invention. The indicating unit 200 can be seen to comprise a silicon controlled rectifier 202 whose anode is connected to terminal 4. As described previously with regard to FIGURE 6 of the drawings, terminal 4 is connected through the control circuitry to a source of positive supply voltage, suitably 12 volts. The cathode of the SCR 202 is connected through lamp 204 and lamp 206 to pin 1 of the indicating unit. Pin 1, as described previously, is connected by the control circuitry to ground. The gate electrode of SCR 202 is connected through resistor 208 to the cathode. The gate electrode of SCR 202 is also connected through resistor 210 to pin 3 of the indicating unit. Pin 3 is connected by the control circuitry to cable 16. The other side of the resistor 210 is also connected through diode 212 to pin 5 of the indicating module. Pin 5 is in turn connected by the control circuitry to the test switch 18. The cathode of the SCR 202 is also connected to the anode of a diode rectifier 214, the cathode of the diode rectifier 214 being connected to pin 6. The pin 6 is in turn connected by the control circuitry to the gate electrode of the SCR 116 included in the control circuitry. The cathode of the SCR 202 is also connected through capacitor 216 to the anode of diode rectifier 218, the anode of the rectifier 218 being connected to pin 2 which is connected by the control circuitry to control the operation of the horn 56. The juncture between the capacitor 216 and the anode of rectifier 218 is connected through resistor 220 to pin 1. The cathode of the SCR 202 is further connected through resistor 222, resistor 224, resistor 226 and resistor 228 to pin 1. The juncture between resistors 222 and 224 is connected by capacitor 230 to the juncture between the resistors 224 and 226. The juncture between resistors 224 and 226 is also connected to the anode of diode rectifier 232, the cathode of diode rectifier 232 being connected to pin 7. As described previously with respect to FIGURE 6, the pin 7 is connected by the control circuitry to the anode of SCR 116.

It will also be observed that in the event the indicator unit is to be operated in the marked acknowledge mode, that pin 7 is suitably connected through the switch 20 to ground. However, if only the marked acknowledge mode is to be utilized, diode rectifier 214 and pin 6 will not be provided. The juncture betwen lamps 204 and 206 is connected through resistor 234 to the anode of SCR 236. The cathode of the silicon controlled rectifier is connected to pin 1. The gate electrode of the SCR 236 is connected to the juncture between resistors 226 and 228 and also connected through resistor 238 to the cathode of SCR 236.

In operation of the circuitry shown in FIGURE 9, the lamps 204 and 206 are chosen such that different amounts of current flow are required to energize the lamps. Thus, lamp 204 is suitably colored red and requires a current flow of in the order of 330 milliamps to be lit. Lamp 206 is suitably white and requires only 100 milliamps of current to be lit. The resistance of lamp 206 in therefore substantially greater than the resistance of lamp 204.

When a signal is applied to the gate electrode of SCR 202, either from pin 3 or pin 5, the SCR 202 will switch from its normally high impedance state to its quasi stable low impedance state and current will flow through the series circuit comprising the lamps 204 and 206 to ground, through pin 1. However, the series circuit comprising the two lamps is of sufficiently high resistance that only sufficient current will flow to energize the lamp 206 and lamp 204 will remain very dim. The light produced by the indicator on the panel will therefore be white.

If the indicating unit is being operated in the marked acknowledge mode, this condition will remain since the juncture point between resistor 224 and 226 is connected to ground by the normally closed switch 20, preventing biasing current being applied to the gate electrode of the SCR 236. The change in voltage produced at the cathode of SCR 202 as the SCR 202 turns on is differentiated by the differentiating network comprising capacitor 216 and resistor 220 and applied through the diode rectifier 218 as a control pulse to cause the circuitry connected to the horn 56 to apply power to the horn 56.

When the contacts of switch 20 are open, responsive to the operator acknowledging the existence of the malfunction, current will flow through the resistors 226 and 228 to pin 1, providing a biasing signal to the gate electrode of the SCR 236. The SCR 236 will thereupon switch from its normally high impedance state to its quasi stable low impedance state. The voltage across the lamp 206 will drop to a very low level, causing the lamp 206 to dim to an extremely low level and sufficient current will flow through the lamp 204 that the lamp 204 will glow with its normal degree of brightness. The indication provided on the control panel will therefore change from a white to a bright red color, indicating and that the particular malfunction indicated by the indicating unit has been acknowledged by the operator.

If the annunciator system utilizing the indicating units of the type shown in FIGURE 9 is to be operated in the first out mode, the switch 20 will be disconnected from pin 7, and pins 6 and 7 will be connected to the SCR 116 as shown. Thus, when the first of the indicating units 200 in the annunciator system receives a signal from the field element turning the SCR 202 on, the change of voltage produced at the cathode of the SCR 202 will be differentiaetd by the capacitor 216 and resistor 220 and applied through the diode rectifier 218 to cause the horn 56 to sound an audible alarm.

Anode voltage will be applied to the SCR 116 from the juncture of resistors 224 and 226 and a gate voltage will be applied to the SCR 116 from pin 6. The SCR 116 will therefore switch from the high impedance state to the low impedance state, causing the juncture between resistors 224 and 226 to fall to the potential near ground potential. However, due to the switching time involved in SCR 116 going from the high to the low impedance state, gate voltage will be applied to the SCR 236 from the juncture between resistors 226 and and 228, causing the SCR 236 to also switch to the low impedance state. Therefore, the first of the indicating units to receive a signal from one of the field switches will provide a red indication.

However, since each of the other indicating units included in the annunciator system are commonly connected to the anode of the SCR 116, the juncture points between resistors 224 and 226 of each of the other indicating units will be at ground potential. As other ones of the indicating units receive a signal indicating a malfunction, the respective SCR's 202 will turn on, applying power to the two series connected lamps. However, since the juncture points between the resistors 224 and 226 of each of the units are near ground potential, a biasing signal will not be applied to the gate electrode of the respective SCR's 236. Rectifiers 236 of the remaining indiacting units will therefore remain in the high impedance state, causing these indicating units to glow with a white light, indicating that these malfunctions occurred subsequent to the first one.

Figure 10:
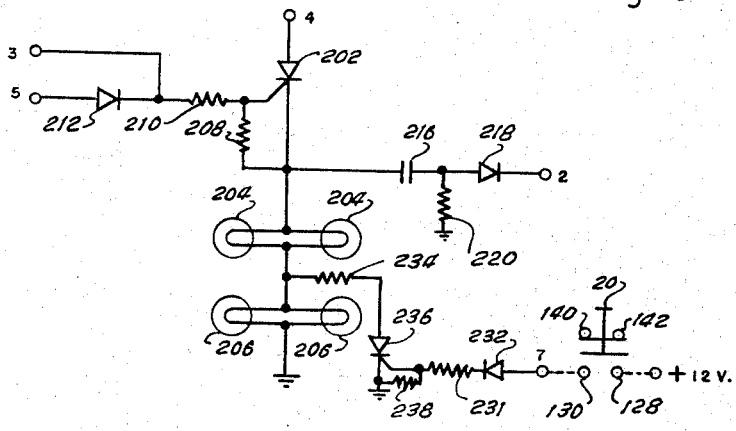
FIGURE 10 is a schematic diagram of still another indicator unit which utilizes the principles of the present invention.

If it is only necessary that the system be capable of operation in the marked acknowledge mode, the circuit of FIGURE 9 can be further simplified as shown in FIGURE 10. The circuit shown in FIGURE 10 is similar in all respects to that shown in FIGURE 9, except that the biasing network comprising resistors 222, 224, 226, 228 and 38 is not provided. Further, since the circuit of FIGURE 10 is intended only to operate in the marked acknowledge mode, the diode 214 and resistor 215 can also be eliminated. In the circuit of FIGURE 10, the gate electrode of SCR 236 is connected to terminal 7 through resistor 231 and diode rectifier 232. Within the control circuitry, the pin 7 is connected through the marked acknowledge switch 20 to a source of positive potential, suitably +12 volts.

Operation of the circuit shown in FIGURE 10 is quite similar to that described above with reference to FIGURE 9. Thus, when a positive signal is applied to pin 3, indicating the presence of a malfunction, SCR 202 will be turned on, causing current to flow through the series connected lamps 204 and 206. As current begins to flow through the lamps 204 and 206, the voltage appearing at the cathode of the SCR 202 will rise. The change in voltage at the cathode of the SCR 202 will be differentiated by the differentiating network comprising capacitor 216 and resistor 220, and the resultant positive pulse is applied through the diode rectifier 218 to pin 2 of the indicating unit. As described previously with respect to FIGURE 8 of the drawings, the positive pulse appearing at pin 2 is applied ot the control rectifier of the SCR 138 which controls the application of power to the audible warning device 56.

Since the lamps 204 and 206 are chosen to have substantially different internal resistances, requiring different levels of current flow to be lit, only one of the lamps 204 and 206 will be lit. Lamp 206 is chosen to have the higher resistance and, in this instance, the white lamps 206 will glow brightly whereas the red lamps 204 will be extremely dim. Thus, each time that one of the indicating units receives a signal indicating the presence of a malfunction at its associated field contact, the white lamp of the particular indicating unit will glow brightly, producing a white indication on the control panel.

The marked acknowledge switch 20 utilized in the embodiment of the invention shown in FIGURE 10 is wired in the manner identical to that shown in FIGURE 6. However, construction of the switch is somewhat different in that the switch is spring loaded in a position such that terminals 140 and 142 will normally be closed and terminals 128 and 130 will normally be open. Thus, when the marked acknowledge switch is pressed, contacts 128 and 130 will be shorted, applying a positive signal through the rectifier 238 and resistor 231 to the gate electrode of SCR 236, causing the SCR 236 to switch to its low impedance state. When SCR 236 switches to its low impedance state, it will provide a low impedance path for current flow through the lamps 204 to ground. The voltage developed across the series circuit comprising resistor 234 and SCR 236 will be sufficiently low that only a small amount of current will flow through the parallel connected lamps 206, and lamps 206 will glow very dimly, if at all.

From the above, it will be seen that the present invention provides an annunciator system for indicating malfunctions of equipment at test stations associated with the equipment that comprises a plurality of indicating units. Each of the indicating units is connected to a respective one of the test stations. A control unit is also provided, the control unit having a condition responsive element which is commonly connected to each of the indicating units. In accordance with some embodiments of the invention, the condition responsive element is a silicon controlled rectifier. In accordance with other preferred embodiments of the invention, the condition responsive element is a switch. However, other types of condition responsive elements can be utilized in practicing the invention. Each of the indicating units also includes a first signal generating means for producing a signal of one character and a second signal generating means for producing a signal of a different character. In accordance with the preferred embodiments of the present invention, the first and second signal generating means are lamps for producing visual indications of different colors. Each of the indicating units also includes means effective responsive to the indication of a malfunction at its respective test station for applying power to the first generating means to cause a signal of the one character to be produced and means effective when the condition responsive element of the control unit is in the one condition and when the first signal generating means of an indicating unit is energized for energizing the second signal generating means to produce a signal of the different character. The preferred means for controlling the application of power to the signal generating means are also silicon controlled rectifiers.

Although the invention has been described with reference to certain preferred embodiments, many changes and modifications will become obvious to those skilled in the art in view of the foregoing description. The preferred embodiments described herein are therefore intended to be illustrative and not limiting of the invention defined in the appended claims.

What I claim is:
1. An annunciator system for indicating malfunctions of equipment at test stations, said system comprising:
   (a) a plurality of indicating units;
   (b) means connecting each of said test stations to a different one of said indicating units;
   (c) a control unit having a condition responsive element commonly connected to each of said indicating units;
   (d) each of said indicating units including a first lamp of a first color for producing a signal of one character and a second lamp of a second color for producing a signal of a different character, the lighting of said second lamp requiring a substantially greater amount of current flow than said first lamp;
   (e) each of said indicating units further including first and second switching devices, each of said switching devices having two power terminals and normally exhibiting a high impedance between said power terminals but being switched to a quasi stable low impedance state when a control signal is applied thereto and remaining in said low impedance state so long as the current flowing through the device remains above a minimum level, the power terminals of said first switching device being connected in a series circuit with said first lamp and said second lamp and said second switching device being connected in shunt with said first lamp;

(f) means for connecting said first switching device, said second switching device, said first lamp and said second lamp in circuit with a direct current supply voltage whereby when said first switching device is in the low impedance state, said first lamp will display a signal of said one character and when said second switching device is in the low impedance state, said second lamp will display a signal of said different character;

(g) means for applying a control signal to said first switching device to switch said first switching device from the normally high impedance state to the low impedance state responsive to indication of a malfunction at the test station connected thereto; and (h) means for controlling said second switching device to switch from its normally high impedance state to its low impedance state responsive to said first switching device switching to its low impedance state when said condition responsive element is in one condition; whereby when said first switching device is in the low impedance state, only said first lamp will be lit and when both said first and said second switching devices are in the low impedance state, only said second lamp will be lit.

2. Apparatus as defined in claim 1 further including means effective responsive to said first switching device being switched to the low impedance state for applying to said second switching device a signal of a character to cause said second switching device to switch to the low impedance state and wherein said condition responsive means comprises means for disabling said last mentioned means when in the other condition.

3. Apparatus as defined in claim 2 wherein said condition responsive element comprises a manually operated switch, said manually operated switch being closed to ground when in said other condition and open when in said one condition.

4. Apparatus as defined in claim 1 wherein said first switching device is a first silicon controlle drectifier and said second switching device is a second silicon controlled rectifier.

5. Apparatus as defined in claim 4 wherein said condition responsive means comprises a switch effective when closed to apply to a gate electrode of said second silicon controlled rectifier a signal to cause said second silicon controlled rectifier to switch to the low impedance state.

6. Apparatus as defined in claim 4 wherein said condition responsive means comprises a third silicon controlled rectifier and further including means effective responsive to said first silicon controlled rectifier being switched to the low impedance state for applying to the gate electrode of said third silicon controlled rectifier a signal of a character to cause said third silicon controlled rectifier to assume its other condition in which said third silicon controlled rectifier exhibits a low impedance between its power terminals, and means connecting the power terminals of said third silicon controlled rectifier to prevent a signal being applied to the gate of the second silicon controlled rectifier of a character to cause said second silicon controlled rectifier to switch to its low impedance state.

7. An annunciator for indicating malfunctions of equipment at test stations that comprises:
a plurality of indicating units, each indicating unit including:
first signal generating means for producing a signal of one character and a second signal generating means for producing a signal of a different character,
a control unit connecting each of said test units to a different one of said indicating units,
said control unit including:
first out means for actuating the first signal generating means of an indicating unit upon a malfunctioning at one test station and thereafter a second signal generating means of another indicating unit for any subsequent malfunctions at other stations,
acknowledgment means for selectively actuating said second signal generating means of one indicating unit for the first and subsequent malfunctionings of test stations, and
means for actuating said first signal generating means of said one indicating unit to acknowledge the prior malfunctions so that subsequent malfunctions at other test stations actuate said second signal generating means, and
means for selectively operating said first out means or said acknowledgment means.

8. An annunciator for selectively indicating, in either of two modes, an abnormal condition in at least one of a plurality of test stations, comprising:
an indicating unit associated with each of said test stations, each indicating unit including:
first, second, and third signal generating means for producing first, second, and third signal displays respectively,
a switching device associated with each signal generating means;
a control unit including a condition responsive element operable in response to an abnormal condition in at least one of said test stations, said control unit connected in common with said indicating units;
a manually operable mode selector operable in a first mode position to render the first signal display of a first indicating unit operative in response to the first occurrence of an abnormal condition and to render said second signal displays operative in response to subsequent abnormal conditions, said mode selector operable in a second mode position to render said second signal displays operative in response to occurrences of abnormal conditions in said test stations;
acknowledgment means operative when said mode selector is in said second mode position to change said second signal displays to said third signal displays upon normal operation of said acknowledge means and further operative to render said second signal displays, not previously acknowledged, operative in response to abnormal conditions occurring in said test stations,
whereby abnormal conditions occurring subsequent to operation of said acknowledgment means are distinguished from abnormal conditions occurring prior to operation of said acknowledgment means.

References Cited

UNITED STATES PATENTS

| | | | |
|---|---|---|---|
| 3,084,338 | 4/1963 | Mauer | 340—213 |
| 3,109,929 | 11/1963 | Picard | 340—213 |
| 3,234,541 | 2/1966 | Paull | 340—226 |
| 3,287,717 | 11/1966 | Kraus | 340—213.1 |

THOMAS B. HABECKER, *Primary Examiner.*

U.S. Cl. X.R.

307—252; 340—253, 324, 378